United States Patent
Gaucas et al.

(10) Patent No.: US 8,325,367 B2
(45) Date of Patent: Dec. 4, 2012

(54) SYSTEM AND METHOD FOR A DESIGN WITH INTENT METADATA

(75) Inventors: Dale Ellen Gaucas, Penfield, NY (US); Kirk J. Ocke, Ontario, NY (US); Michael David Shepherd, Ontario, NY (US)

(73) Assignee: Xerox Corporation, Norwalk, CT (US)

(*) Notice: Subject to any disclaimer, the term of this patent is extended or adjusted under 35 U.S.C. 154(b) by 575 days.

(21) Appl. No.: 12/493,942

(22) Filed: Jun. 29, 2009

(65) Prior Publication Data

US 2010/0328725 A1   Dec. 30, 2010

(51) Int. Cl.
  *G06F 3/12*   (2006.01)
  *G06F 17/00*   (2006.01)
  *G06K 15/00*   (2006.01)

(52) U.S. Cl. ............. 358/1.15; 358/1.13; 358/1.14; 358/1.16; 715/222; 715/223; 715/224; 715/225; 715/226; 715/244; 715/245; 715/246; 715/247; 715/248; 715/249; 715/250; 715/251; 715/252; 715/253; 715/274

(58) Field of Classification Search ............... None
See application file for complete search history.

(56) References Cited

U.S. PATENT DOCUMENTS

| | | | |
|---|---|---|---|
| 7,584,424 B2* | 9/2009 | Hanechak | 715/244 |
| 2006/0066905 A1* | 3/2006 | Takashima et al. | 358/1.18 |
| 2006/0221779 A1* | 10/2006 | Matsushita et al. | 369/30.01 |
| 2008/0050039 A1* | 2/2008 | Jin | 382/284 |
| 2008/0168070 A1 | 7/2008 | Naphade et al. | |
| 2009/0287632 A1 | 11/2009 | Gombert et al. | |
| 2009/0313948 A1 | 12/2009 | Buckley et al. | |
| 2010/0110479 A1 | 5/2010 | Gombert et al. | |
| 2010/0222908 A1 | 9/2010 | Gombert et al. | |

* cited by examiner

*Primary Examiner* — Benny Q Tieu
*Assistant Examiner* — Haris Sabah
(74) *Attorney, Agent, or Firm* — Fox Rothschild LLP (57) ABSTRACT

Systems and methods for automatically assigning items to printable media are disclosed. A computer readable medium is in communication with a computing device and includes programming instructions for electronically obtaining a first template that includes a plurality of first content items, each including a first content area. For each first content item, first content area properties and first content item properties are identified. A second template including a plurality of second content areas is electronically obtained. For each second content area, second content area properties, second content item properties and content rules are automatically identified. For each first content item, it may be determined whether a first content item corresponds to a second content area based on the rules. The first content item may be automatically assigned to the second content area. A representation of each assigned content item may be printed.

19 Claims, 8 Drawing Sheets

FIG. 4 content area A: prominence 2, connected to B, text_content_area
content item for A: importance 2, flowable, sub-settable, testimonial
content area B: prominence 1, connected to C, image_content_area
content item for B: importance 1, resizable, branding_image
content area C: prominence 2, text_content_area
content item for C: importance 1, sub-settle, contact_information content area D: connected to E, prominence 3, image_content_area
content item for D: importance 1, in-proximity with E, real_estate_image content area E: prominence 3, text_content_area
content item for E: importance 1, dependent on D, real_estate_description content area F: connected to G, prominence 3, image_content_area
content item for F: importance 3, in-proximity with G, real_estate_image content area G: prominence 3, text_content_area
content item for G: importance 3, dependent on F, real_estate_description content area H: prominence 4, text_content_area
content item for H: importance 2, flowable, sub-settable, campaign_information

FIG. 5 content area M: prominence 1, connected to N, image_content_area
content item for M: importance 1, campaign_image content area N: prominence 2, text_content_area
content item for N: importance 1, dependent on M, in-proximity with M, campaign_information
605 — 606 — 607 — 608 — 609 —
content area O: prominence 2, connected to M, connected to P, image_content_area
content item for O: importance 2, branding_image
610 — 611 — 612 —
content area P: prominence 2, connected to M, connected to N, text_content_area
content item for P: importance 1, branding_information

FIG. 8

SYSTEM AND METHOD FOR A DESIGN WITH INTENT METADATA

BACKGROUND

The disclosed embodiments relate generally to a method and system for a design with metadata, and more particularly to a system and method for automatically assigning items to printable media. Design metadata may be used to facilitate design reuse across multiple print structures such as different pieces of media in a marketing campaign.

Variable information (VI) printing allows different content, such as graphics, images and text, to be dynamically printed on various printable media in a print job. For example, a set of postcards, each with a similar basic layout, can each be printed with a different name and address.

While content can be modified for the same type of printing job (i.e., changing the address for a postcard), layout and content cannot currently be varied automatically based on the structure of the assembled media (e.g., poster to carton). Currently, the design of each piece of media in a marketing campaign is separately determined. For example, a marketing campaign could include a postcard, a brochure and a gift box. While much of the same content will appear on each piece of media for the marketing campaign, the design of each piece of media must be separately determined, such as by a marketing manager and a graphic designer. This process is inefficient and time consuming.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

As used herein and in the appended claims, the singular forms "a," "an," and "the" include the plural reference unless the context clearly dictates otherwise. Thus, for example, reference to a "template" is a reference to one or more templates and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a system for automatically assigning items to printable media may include a computer device and a computer readable medium in communication with the computing device. The computer readable medium may include one or more programming instructions for electronically obtaining a first template comprising a plurality of first content items, wherein each first content item comprises a first content area, identifying one or more first content area properties and one or more first content item properties for each first content item, electronically obtaining a second template comprising a plurality of second content areas, identifying one or more second content area properties and one or more second content item properties for each second content area, automatically identifying one or more content rules based on the second content area properties, the second content item properties, the first content area properties and the first content item properties, for each first content item: determining whether a first content item corresponds to a second content area based on the corresponding content rules, and automatically assigning the first content item to the second content area in response to a first content item corresponding to a second content area, and printing a representation of each assigned content item based on the second template.

In an embodiment, a computer program product may include a computer readable medium having a computer readable program code embodied therein that is adapted to be executed to implement a method for automatically assigning items to a piece of media. The method may include obtaining a first template comprising a plurality of first content items, wherein each first content item comprises a first content area, identifying one or more first content area properties and one or more first content item properties for each first content item, obtaining a second template comprising a plurality of second content areas, identifying one or more second content area properties and one or more second content item properties for each second content area, automatically identifying one or more content rules based on the second content area properties, the second content item properties, the first content area properties and the first content item properties, for each first content item: determining whether a first content item corresponds to a second content area based on the corresponding content rules, and automatically assigning the first content item to the second content area in response to a first content item corresponding to a second content area, determining whether the content rules corresponding to a second content area do not correspond to content rules of any of the first content items, in response to the content rules corresponding to the second content area not corresponding to the content rules of any of the first content items: identifying a content item from a knowledge base that corresponds to the content rules of the second content area, and automatically assigning the corresponding content item to the second content area, and printing a representation of each assigned content item based on the second template.

In an embodiment, a system for automatically assigning items to printable media may include a computer device and a computer readable medium in communication with the computing device. The computer readable medium may include one or more programming instructions for electronically obtaining a first template comprising a plurality of first content items, wherein each first content item comprises a first content area, identifying one or more first content area properties and one or more first content item properties for each first content item, electronically obtaining a second template comprising a plurality of second content areas, identifying one or more second content area properties and one or more second content item properties for each second content area, automatically identifying one or more content rules based on the second content area properties, the second content item properties, the first content area properties and the first content item properties, for each first content item: determining whether the first content item corresponds to a second content area based on the corresponding content rules, and automatically assigning the first content item to the second content area in response to the first content item corresponding to the second content area, and printing a representation of each assigned content item based on the second template.

In an embodiment, a computer program product may include a computer readable medium having a computer readable program code embodied therein that is adapted to be executed to implement a method for automatically assigning items to a piece of media. The method may include electronically obtaining a first template comprising a plurality of first content items, wherein each first content item comprises a first content area, identifying one or more first content area properties and one or more first content item properties for each first content item, electronically obtaining a second template comprising a plurality of second content areas, identifying one or more second content area properties and one or more second content item properties for each second content area, automatically identifying one or more content rules based on the second content area properties, the second content item properties, the first content area properties and the first content item properties, for each first content item: determining whether the first content item corresponds to a second content area based on the corresponding content rules, and automatically assigning the first content item to the second content area in response to the first content item corresponding to the second content area, and printing a representation of each assigned content item based on the second template.

BRIEF DESCRIPTION OF THE DRAWINGS

Aspects, features, benefits and advantages of the embodiments described herein will be apparent with regard to the following description, appended claims, and accompanying drawings where:

DETAILED DESCRIPTION

A "computing device" refers to a device that processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment. A computing device may interpret and execute instructions.

A "printing device" is an electronic device that is capable of receiving commands, and/or printing text characters and/or images on a substrate, and/or scanning images. Printing devices may include, but are not limited to, network printers, production printers, copiers and other devices using ink or toner, and scanners. A printing device may also perform a combination of functions such as printing/scanning, in which case such a device may be considered a multifunctional device.

A "knowledge base" is an electronic repository of searchable data. A knowledge base may refer to a software component, such as, but not limited to, a content management system (CMS), a database or a table. Alternatively, a knowledge base may refer to a hardware component, such as, but not limited to, a tangible storage medium.

A "template" is a design for placement of one or more content items on a piece of media. In an embodiment, a template is a skeleton design that includes locations for a plurality of content items. A template is subdivided into one or more content areas or copy holes. A document instance may be created when a copy of the dynamic template is instantiated with content items, for a given campaign and/or a given recipient.

A "content item" is a portion of an image or text that is configured to be placed in a content area. A content item may include, but is not limited to, a picture, graphic, number, letter and/or symbol. A content item may denote a fixed value (e.g., the string "32 Oak Drive") or it may denote a variable information object (e.g., an object representing an address whose value is replaced at print time with a different address string for each recipient on a mailing list).

A "structural design intent" identifies structural aspects of a content area and/or structural relationships between content areas. For example, a structural intent may be used to denote the boundaries of a content area, aspects of its placements in a design and its physical relationship to other content areas.

A "semantic design intent" identifies domain-independent, cross-domain and/or domain-dependent aspects of a content item. A design intent is metadata that may be represented in a content model. In an embodiment, a content object model may support the capture, store and access of design intent information. For example, a design intent may be used to denote information such as, without limitation, a company branding image for a content item.

Figure 1:
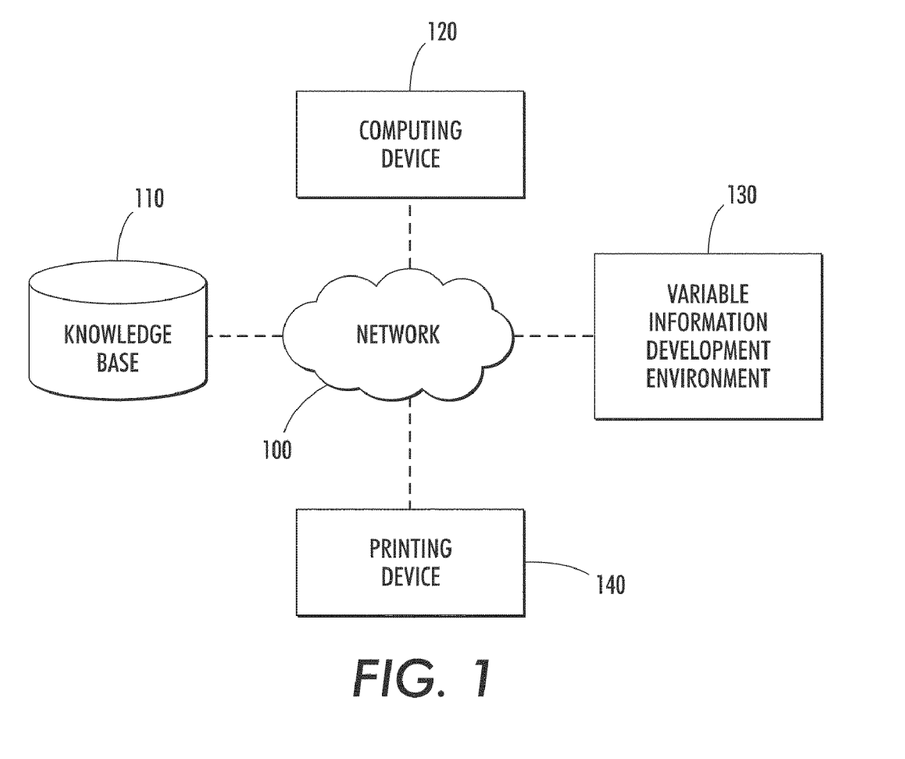
FIG. 1 illustrates a block diagram of an exemplary system for reusing a variable information printing design for a piece of media according to an embodiment.

FIG. 1 illustrates a block diagram of an exemplary system for reusing a variable information printing design for a piece of media according to an embodiment. As shown in FIG. 1, the system includes a knowledge base 110, a computing device 120, a variable information printing development environment 130, a printing device 140 and a network 100. A network 100 may include, but is not limited to, a local area network (LAN), a wide area network (WAN), the Internet, an intranet and/or any other communications network.

The knowledge base 110 may include a format that allows for the description of classes, attributes, properties, individuals and associated relationships between various structural and semantic design constructs. The structural design constructs define individual objects of a class and provide attribute/value pairs for the individual objects and restrictions for certain classes. The class concept may be used to represent a group or set of individual objects, such as, content items, with similar characteristics.

The knowledge base 110 may also store individual templates that can be searched and retrieved based on the intended medium (e.g., a postcard) and based on metadata that may include design intent metadata. The knowledge base 110 may also support the assignment of design intent metadata to templates.

The knowledge base 110 may communicate with a computing device 120, a variable information printing development environment 130 and a printing device 140. In an embodiment, the knowledge base 110 may be distributed across a plurality of devices including, but not limited to, the computing device 120, the variable information printing development environment 130 and/or the printing device 140. In an embodiment, the knowledge base 110, or a portion thereof, may be contained within the computing device 120, the variable information printing development environment 130 and/or the printing device 140. In such an embodiment, the knowledge base 110 may directly communicate with the computing device 120, the variable information printing development environment 130 and/or the printing device 140 in which it is contained instead of via the network 100.

In an embodiment, output from the variable information printing development environment 130 may be stored in the knowledge base 110. The output of the variable information printing development environment 130 may be printed on the printing device 140.

Figure 2:
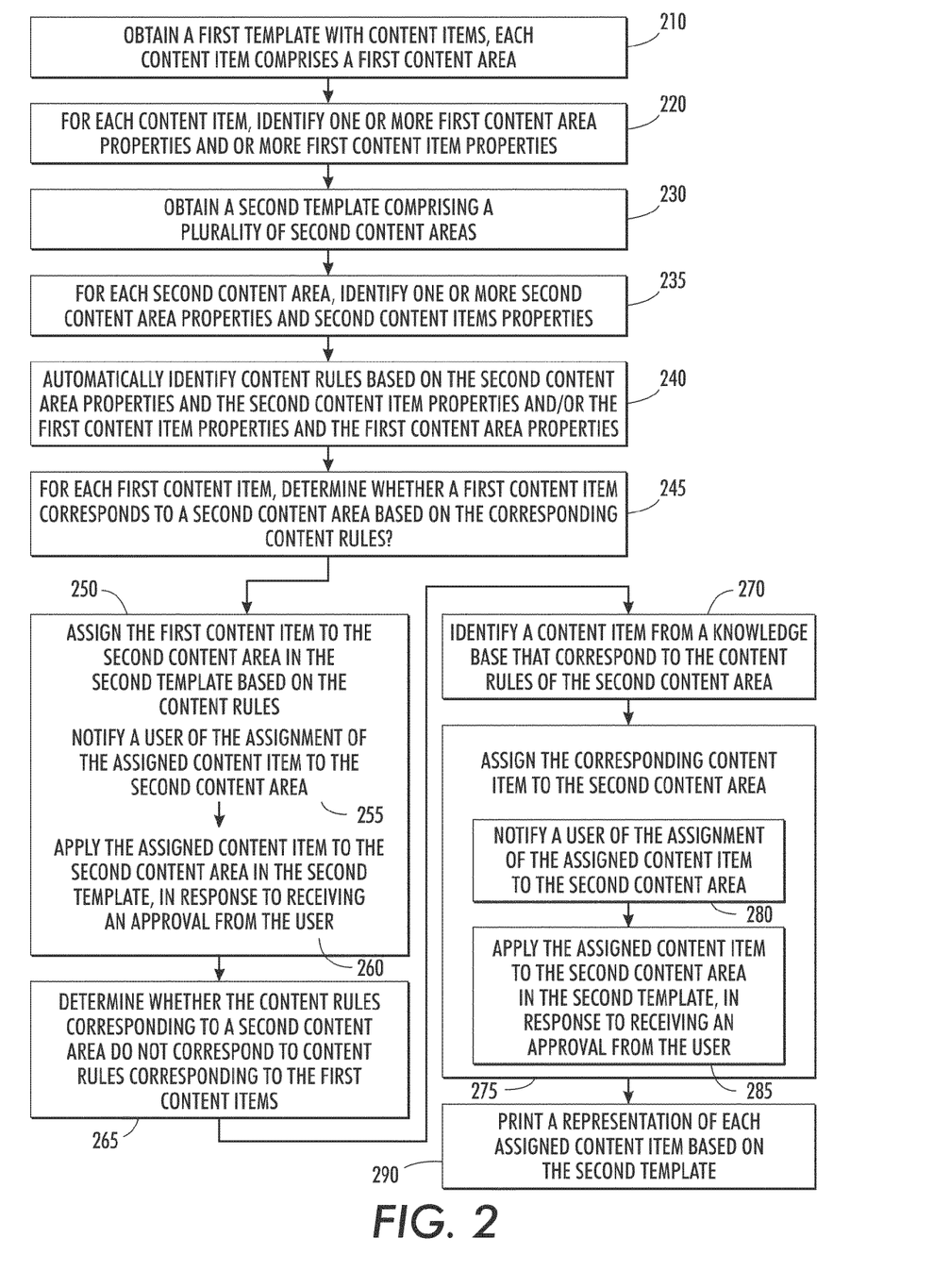
FIG. 2 discloses a flow diagram of an exemplary method for automatically assigning items to a piece of media according to an embodiment.

FIG. 2 discloses a flow diagram of an exemplary method for automatically assigning items to a piece of media according to an embodiment. A first template including one or more content items may be obtained 210. Each content item may be placed in a content area. A content area on the template may include one or more intents. Intents may include, without limitation, structural design intents and/or semantic design intents. The intents may be used to create one or more content area properties.

Figure 3:
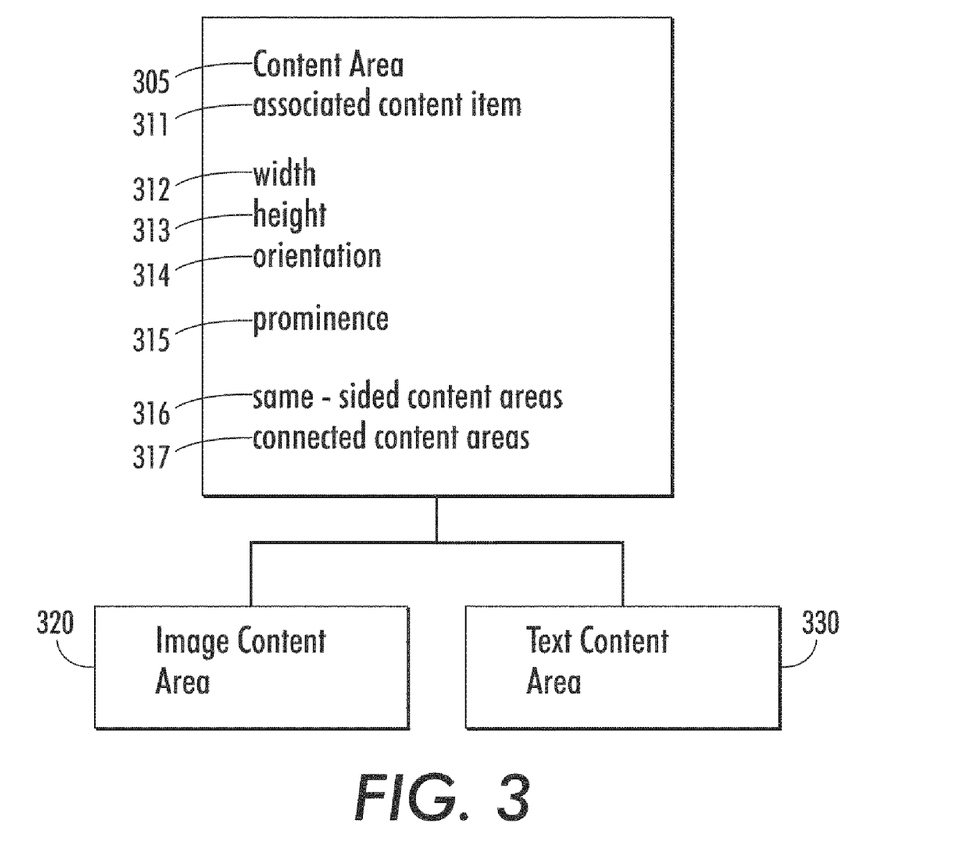
FIG. 3 discloses an exemplary content area model depicting properties associated with a content area according to an embodiment.

FIG. 3 discloses an exemplary content area model depicting properties associated with a content area according to an embodiment. A content area 305 may be associated with one or more content items 311. A content area may include properties, such as, without limitation, width 312, height 313, orientation 314, prominence 315, same-sided content areas 316 and/or connected content areas 317.

Prominence 315 may refer to the visibility of a location of a content area on a medium. In an embodiment, a numerical ranking may be assigned to represent a content area's prominence. In an embodiment, a lower number may represent a higher prominence 315. The numerical value may be determined based on the visibility of the content area. If a content area is visible, such as at a location on the top or center of a single sheet, a front display panel of a box and/or surrounded by graphics drawing attention to the location, the content area may receive a value indicating a high prominence 315.

A content area may be a same-sided content area 316 with respect to a second content area if one content area is on the same face as the second content area. For example, same-sided content areas may appear on the same page of a brochure, the same side of a tri-fold pamphlet and/or the same face of a folded carton.

A content area may be a connected content area 317 with respect to a second content area if a first content area is adjacent to a second content area. For example, a first content area may be connected to a second content area if they are neighboring content areas, such as, left to right, top to bottom, or side to side on media. In an embodiment, content areas are connected if they are adjacent to one another on a single side or touching sides of a folded carton. In an embodiment, the presence of connected content areas may imply that the contained content was split across the content areas.

A content area may be an image content area 320 and/or a text content area 330. An image content area 320 may include, without limitation, a picture, a map, a graph, a graphic and/or a photograph. A text content area 330 may include, without limitation, one or more written or typed words, symbols and/or numbers.

Referring back to FIG. 2, each content area may include one or more content items. For each content item in a first template, one or more content area properties and content item properties may be identified 220.

Figure 4:
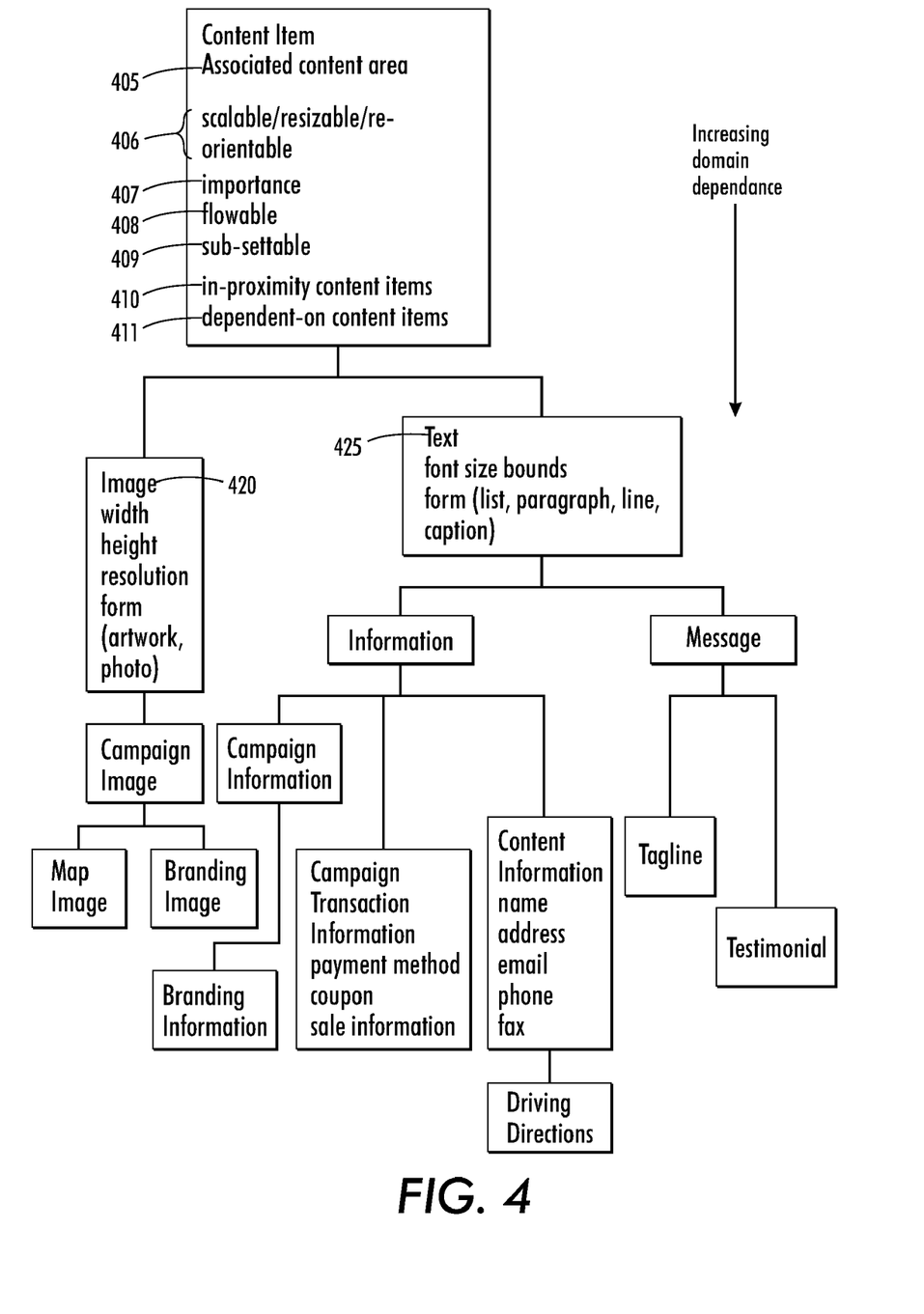
FIG. 4 discloses an exemplary content item model depicting properties associated with a content item according to an embodiment.

FIG. 4 discloses an exemplary content item model depicting properties associated with a content item according to an embodiment. A content item 405 may be positioned in a first template. As shown in FIG. 4, each content item 405 may include one or more properties. These properties may include, without limitation, whether a content item 405 is scalable/resizable/re-orientable 406, important 407, flowable 408, sub-settable 409, in-proximity to another content item 410 and/or dependent on another content item 411. A content item 405 may be scalable/resizable/re-orientable 406 relative to a provided set of parameters. For example, a content item 405 may include a range of font sizes that can be used to fit the content item into a content area. Alternatively, an image that is an "actual size" picture of a product may not be resizable.

Importance 407 may be used to determine the order in which content items are associated with a template. For example, a first content item may have a higher importance value than a second content item in a first template. If the first template is then converted to a second template, the first content item will be associated with a content area in the second template before the second content item is associated with a content area in the second template (i.e., the second template may not have enough content areas to accommodate both the first and second content items). In an embodiment, a lower numerical value may indicate a higher importance 407.

A content item 405 may be flowable 408 if the content item can be split and associated with two connected content areas in a template.

A content item 405 may be sub-settable 409 if a reduced version of the content for a content item can be used in a template. A sub-settable content item may be utilized when a template is unable to accommodate a full version of the content item 405. For example, a content item may include five customer testimonials. If the content area does not fit all five testimonials and the content item is sub-settable, then only the first three testimonials which fit into the content area will be assigned to the content area More sophisticated sub-settable components may also be used. In an embodiment, text in the content item may be filtered to retrieve only a personalized location or a current date. For example, in a golf brochure, text may be filtered to provide all golf courses within 10 miles of a location, all golf tournaments for May and June or other relevant information.

A content item may be in-proximity to 410 another content item if the first and the second content items must be placed in content areas that are connected.

A content item may be dependent on 411 another content item when a second content item must be placed in a template if a first content item was placed in the template. For example, if a first content item is dependent on a second content item, then the first content item is only associated with a content area in a template when the second content item is also associated with a content area in the template.

A content item may include, without limitation, an image 420 and/or text 425. Properties of an image may include, without limitation, width, height, resolution, form (i.e., artwork and/or photography), a campaign image, a map image and/or a branding image. Properties of text may include, without limitation, font size, boundaries, form (i.e., a list, a paragraph, a line and/or a caption), campaign information, branding information, transactional information (i.e., payment method, coupon and/or sales information), contact information (i.e., name, address, e-mail address, phone number and/or fax number), driving directions, and/or a message (i.e., a tagline and/or a testimonial).

Figure 5:
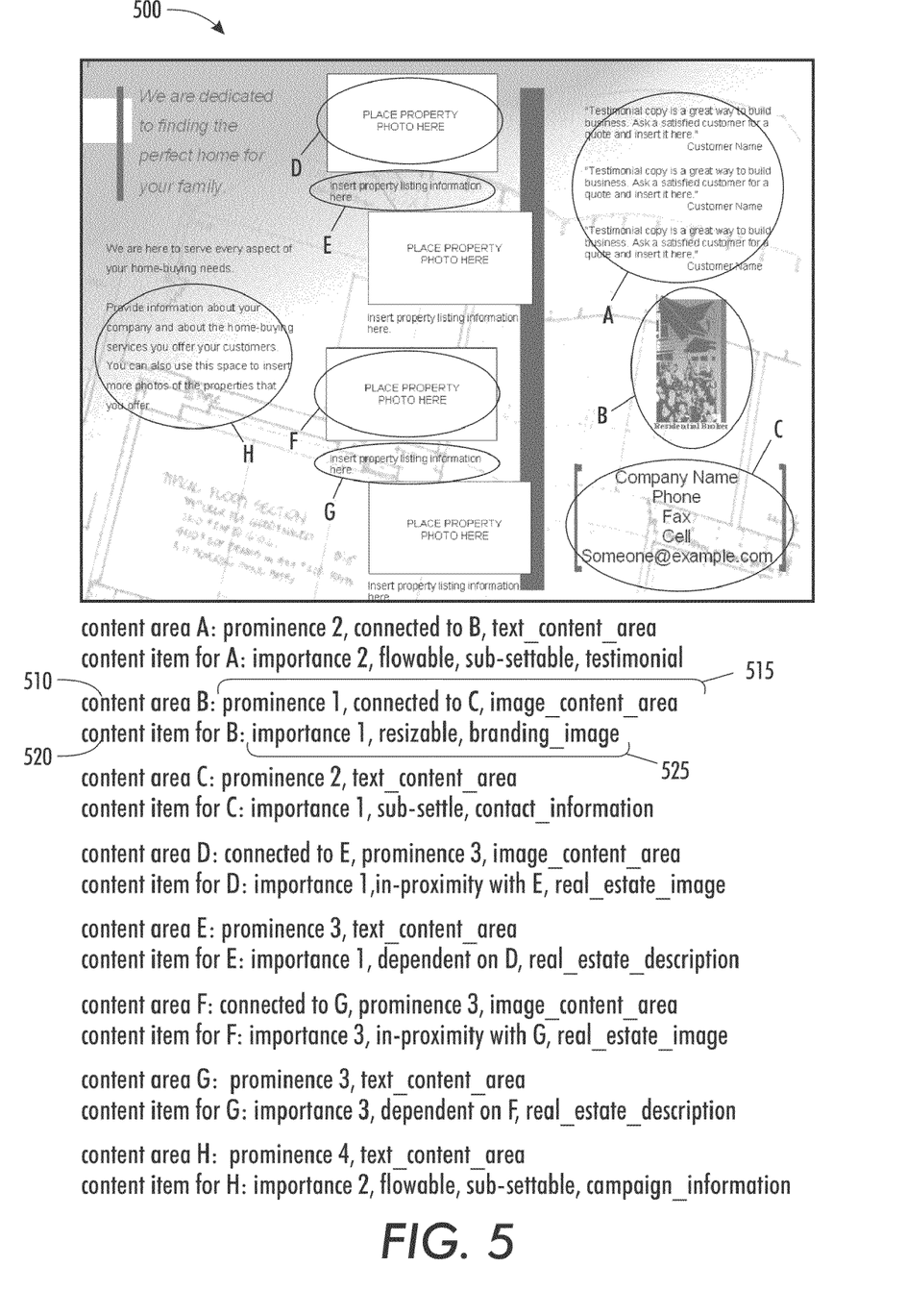
FIG. 5 illustrates an exemplary first template for a campaign brochure with content area properties and content item properties extracted for each content area according to an embodiment.

FIG. 5 illustrates an exemplary first template with content area properties and content item properties identified for each content area according to an embodiment. Referring to the tri-fold real estate brochure template 500, content area 'B' 510 includes an associated content item 520. The properties 515 of the content area 'B' 510 may include a prominence rating of 1, that content area 'B' is connected to content area 'C' and that content area 'B' contains an image. The properties 525 of the associated content item 520 for content area 'B' 510 may include an importance rating of 1, that the content item is resizable and that the content item is a branding image.

Referring back to FIG. 2, a second template may be obtained 230. The second template may be a template for a multidimensional product. In an embodiment, the second template may be for a three dimensional structure, while the first template may be for a two dimensional structure. In an embodiment, the second template may be for a two dimensional structure, while the first template may be for a three dimensional structure. The second template may include a plurality of content areas. For each content area in the second template, one or more content area properties and one or more content item properties may be identified 235.

Figure 6:
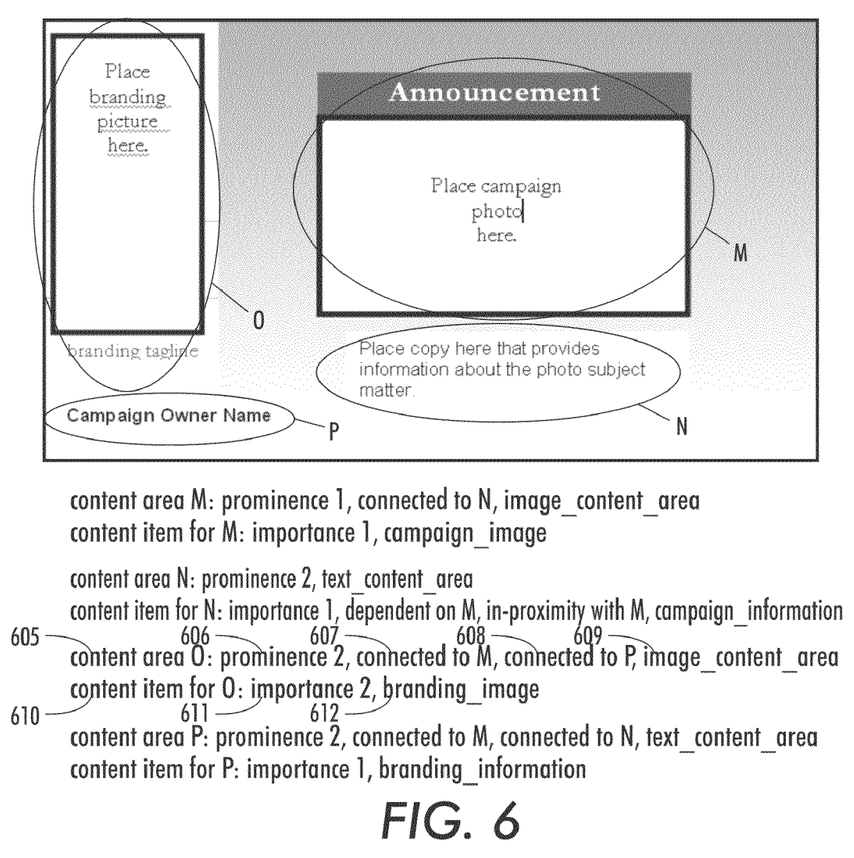
FIG. 6 illustrates an exemplary second template for a general campaign postcard according to an embodiment.

FIG. 6 illustrates an exemplary second template for a general campaign postcard according to an embodiment. Content area properties extracted from content area 'O' 605 may include a prominence rating of 2 606, that content area 'O' is connected to content area 'M' 607 and content area 'P' 608, and that content area 'O' is an image 609. The content item properties for content area 'O' 610 may include an importance rating of 2 611 and a branding image 612.

Referring back to FIG. 2, based on the content area properties and the content item properties from the first template and the second template, content rules may be automatically identified 240. In an embodiment, the content rules may be determined using a processor. By using a processor, the content area properties and the content item properties for both the first and second templates are used to instantiate rules which can be applied to determine which content items from the first template can be used in the content areas of the second template.

For each first content item in the first template, it may be determined 245 whether a content item from the first template corresponds to a content area in the second template based on the corresponding content rules. For example, the content rules may be used to select content item 'B' 510 in FIG. 5 to use in the second template because content item 'B' is an image that corresponds to content area properties and content item properties for content area 'O' 605 of the second template shown in FIG. 6.

Content rules may be created based on content item properties and/or content area properties in the first and/or second templates. In an embodiment, one content item property may be importance and one content area property may be prominence. In an embodiment, one content area property may be size, and one content item property may be the ability to be resized. In an embodiment, one content area property may be whether the content area includes an image and/or text. In an embodiment, one content area property may be connected, and one content item property may be flowable.

Referring back to FIG. 2, the content item from the first template may be assigned 250 to the content area in the second template based on the corresponding content rules. In an embodiment, the assigned content item may include a user being notified 255 of the assignment. The notification may include, without limitation, a message on a display screen and/or an e-mail message. In response to receiving a disapproval from a user regarding the location of the content item, the content item may be placed in a different location. In response to receiving an approval from the user, the content item may be applied 260 to the content area in the second template.

Figure 7:
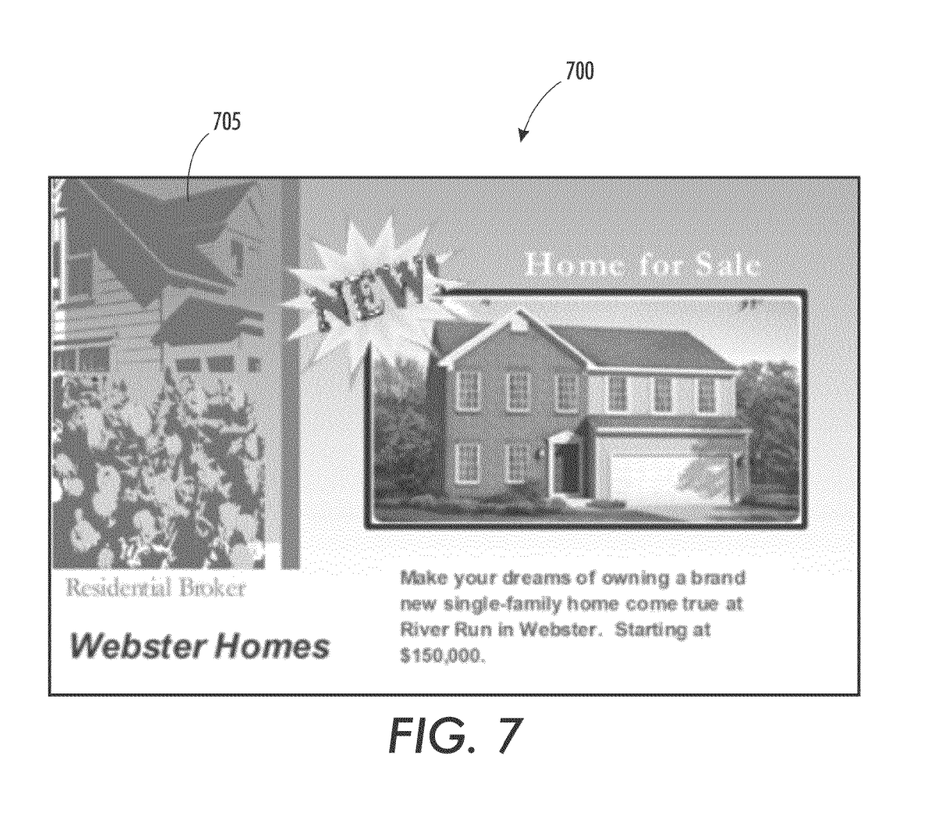
FIG. 7 depicts an exemplary completed second template with content items displayed in each content area according to an embodiment.

In an embodiment, after applying content items from the first template for each content area in the second template, the second template may be complete. FIG. 7 depicts a completed second template with content items displayed in each content area according to an embodiment. In the postcard 700, content item 'B' may be placed in content area 'O' 705 based on the content rules.

Referring back to FIG. 2, it may be determined that content rules corresponding to one or more content areas on the second template do not correspond 265 to any of the content rules corresponding to the content items on the first template. In response to the content area in the second template not corresponding to any of the content items in the first template, a content item stored in a knowledge base may be identified 270. The stored content item may correspond to the content rules of the content area in the second template. In an embodiment, the content item from the knowledge base may be assigned 275 to the content area in the second template based on the corresponding content rules.

In an embodiment, assigning a content item to the second template may include notifying 280 a user of the assignment. The notification may include, without limitation, a message on a display screen and/or an e-mail message. In response to receiving a disapproval from a user regarding the location of the content item, a new content item from the knowledge base may be identified. In response to receiving an approval from the user, the assigned content item may be applied 285 to the content area in the second template.

In an embodiment, a representation of the assigned content items may be printed 290 based on the second template. In an embodiment, the representation of the applied content item may be printed on media via a printing device.

Figure 8:
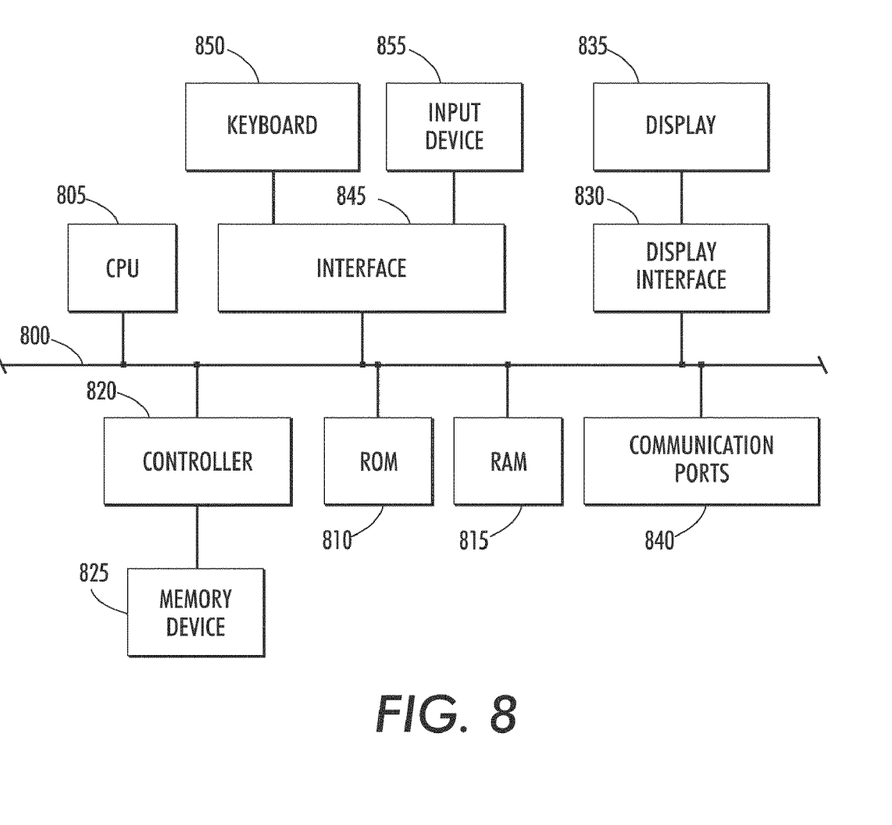
FIG. 8 depicts a block diagram of exemplary internal hardware that may be used to contain or implement program instructions according to an embodiment.

FIG. 8 depicts a block diagram of exemplary internal hardware that may be used to contain or implement program instructions according to an embodiment. A bus 800 serves as the main information highway interconnecting the other illustrated components of the hardware. CPU 805 is the central processing unit of the system, performing calculations and logic operations required to execute a program. Read only memory (ROM) 810 and random access memory (RAM) 815 constitute exemplary memory devices.

A controller 820 interfaces with one or more optional memory devices 825 to the system bus 800. These memory devices 825 may include, for example, an external or internal DVD drive, a CD ROM drive, a hard drive, flash memory, a USB drive or the like. As indicated previously, these various drives and controllers are optional devices.

Program instructions may be stored in the ROM 810 and/or the RAM 815. Optionally, program instructions may be stored on a tangible computer readable medium such as a compact disk, a digital disk, flash memory, a memory card, a USB drive, an optical disc storage medium, such as Blu-ray™ disc, and/or other recording medium.

An optional display interface 830 may permit information from the bus 800 to be displayed on the display 835 in audio, visual, graphic or alphanumeric format. Communication with external devices may occur using various communication ports 840. An exemplary communication port 840 may be attached to a communications network, such as the Internet or an intranet.

The hardware may also include an interface 845 which allows for receipt of data from input devices such as a keyboard 850 or other input device 855 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for automatically assigning items to printable media, comprising:
   a computer device,
   a computer readable medium in communication with the computing device, the computer readable medium comprising one or more programming instructions for:
      electronically obtaining a first template comprising a plurality of first content items, wherein each of the first content item comprises a first content area,
      for each of the first content items, identifying one or more first content area properties and one or more first content item properties,
      electronically obtaining a second template comprising a plurality of second content areas,
      for each of the second content areas, identifying one or more second content area properties and one or more second content item properties,
      automatically identifying one or more content rules based on the second content area properties, the second content item properties, the first content area properties and the first content item properties,
      selecting any of the first content items,
      determining whether the selected first content item corresponds to any of the second content area based on the corresponding content rules, and
      automatically assigning the selected first content item to a corresponding one of the second content area in response to determining that the selected first content item correspond to the corresponding second content area, and
      printing a representation of the selected first content item in the corresponding second content area based on the second template;
   wherein:
      the automatically identifying content rules comprises:
         identifying a value for a first content item importance property for the selected first content item,
         identifying a value for a second content item importance property for an additional one of the first content items, and
         determining that the value for the second content item importance property is less than the value for the first content item importance property; and
      assigning the selected first content item, rather than the additional first content items, to the corresponding one of the second content area is also in response to the value for the second content item importance property being less than the value for the first content item importance property.

2. The system of claim 1 wherein:
   the automatically identifying content rules comprises:
      identifying a value for a second content area connected property for a plurality of the second content areas that are adjacent to each other, and
      identifying a value for a first content item flowable property for any of the first content items; and
   the computer readable medium also comprises programming instructions for assigning the selected first content item to the plurality of the second content areas that are adjacent to the first content item's corresponding second content area and splitting the selected first content item across the corresponding second content area and its adjacent content areas.

3. The system of claim 1 wherein:
   the automatically identifying one or more content rules comprises:
      identifying a value for a second content area prominence property for any of the second content areas;
      identifying a value for a first content item importance property for any of the first content items; and
      determining whether the value for the second content area prominence property corresponds to the value for the first content item importance property, and
   assigning the selected first content item to the corresponding second content area is also in response to the value for the second content area prominence property corresponding to the value for the first content item importance property.

4. The system of claim 1 wherein:
   the one or more programming instructions further comprise one or more programming instructions for:
      identifying a value for a second content area size property for any of the second content areas;
      identifying a value for a first content area size property for any of the first content areas;
      determining whether the first content item corresponding to the first content area includes a resizable content item property; and
      resizing the selected first content item to fit in the corresponding second content area in response to the selected first content item including the resizable content item property; and
   wherein the assigning comprises assigning the resized selected first content item to the corresponding second content area.

5. The system of claim 1 wherein:
   the automatically identifying content rules comprises:
      identifying a value for a second content area image property for any of the second content areas;
      identifying a value for a first content area image property for any of the first content areas; and
      determining whether the value of the first content area image property corresponds to the value of the second content area image property, and
   assigning the selected first content item to the corresponding second content area is also in response to the value of the first content area image property corresponding to the value of the second content area image property.

6. The system of claim 1 wherein:
   the automatically identifying content rules comprises:
   identifying a value for a second content area text property for any of the second content areas;
   identifying a value for a first content area text property for any of the first content areas; and
   determining whether the value for the second content area text property corresponds to the value for the first content area text property, and
   assigning the selected first content item to the corresponding second content area is also in response to the value for the second content area text property corresponding to the value for the first content area text property.

7. The system of claim 1 wherein the first template comprises a template for a two dimensional structure and the second template comprises a template for a three dimensional structure.

8. The system of claim 1 wherein the first template comprises a template for a three dimensional structure and the second template comprises a template for a two dimensional structure.

9. The system of claim 1 wherein the one or more programming instructions further comprise one or more programming instructions for:
   identifying a first content item dependent property for the selected first content item;
   based on the first content item dependent property, identifying an additional one of the first content items that is dependent on the selected first content item;
   identifying an additional one of the second content areas; and
   assigning the dependent first content item to the additional one of the second content areas.

10. A computer program product, comprising a non-transitory computer readable medium having a computer readable program code embodied therein, said computer readable program code adapted to be executed to implement a method for automatically assigning items to a piece of media, the method comprising:
   obtaining a first template comprising a plurality of first content items, wherein each of the first content item comprises a first content area,
   for each of the first content items, identifying one or more first content area properties and one or more first content item properties,
   obtaining a second template comprising a plurality of second content areas,
   for each of the second content areas, identifying one or more second content area properties and one or more second content item properties,
   automatically identifying one or more content rules based on the second content area properties, the second content item properties, the first content area properties and the first content item properties,
   selecting any of the first content items,
   determining whether the selected first content item corresponds to any of the second content area based on the corresponding content rules, and
   automatically assigning the selected first content item to a corresponding one of the second content area in response to determining that the selected first content item correspond to the corresponding second content area, and
   identifying an additional one of the second content area for which the corresponding content rules that do not correspond to content rules of any of the first content items,
   in response to the content rules corresponding to the additional second content area not corresponding to the content rules of any of the first content items:
   identifying a knowledge base content item base from a knowledge base that correspond to the content rules of the additional content area, wherein the knowledge base content is not one of the plurality of first content items, and
   automatically assigning the knowledge base content item to the additional second content area,
   printing a representation of the selected first content item in a first location based on the corresponding second content area of the second template, and
   printing a representation of the knowledge base content item in a second location based on the additional second content area of the second template;
   wherein:
   the automatically identifying one or more content rules comprises:
      identifying a value for a first content item importance property for the selected first content item,
      identifying a value for a second content item importance property for an additional one of the first content items, and
      determining that the value for the second content item importance property is less than the value for the first content item importance property; and
   assigning the selected first content item, rather than the additional first content items, to the corresponding one of the second content area is also in response to the value for the second content item importance property being less than the value for the first content item importance property.

11. The computer program product of claim 10 wherein:
   the automatically assigning the selected first content item to the corresponding second content area comprises notifying a user of the assignment of the selected first content item to the corresponding second content area; and
   applying the selected first content item to the corresponding second content area is also in response to receiving an approval from the user.

12. The computer program product of claim 10 wherein:
   the automatically assigning the knowledge base content item to the additional second content area comprises notifying a user of the assignment of the knowledge base content item to the additional second content area; and
   applying the knowledge base content item to the additional second content area is also in response to receiving an approval from the user.

13. The computer program product of claim 10 wherein:
   the automatically identifying content rules comprises:
      identifying a value for a second content area connected property for a plurality of second content areas that are adjacent to each other; and
      identifying a value for a first content item flowable property for any of the first content items, and
   automatically applying a assigning the selected first content item also comprises splitting the selected first content item across the corresponding second content area and its adjacent content areas.

14. The computer program product of claim 10 wherein:
   the automatically identifying one or more content rules comprises:
      identifying a value for a second content area prominence property for any of the second content areas;
      identifying a value for a first content item importance property for any of the first content items; and determining whether the value for the second content area prominence property corresponds to the value for the first content item importance property, and assigning the selected first content item to the corresponding second content area is also in response to the value for the second content area prominence property corresponding to the value for the first content item importance property.

15. The computer program product of claim 10 wherein: the code is further adapted to be executed so that the method also comprises:
  identifying a value for a second content area size property for any of the second content areas;
  identifying a value for a first content area size property for any of the first content areas;
  determining whether the first content item corresponding to the first content area includes a resizable content item property; and
  resizing the selected first content item to fit in the corresponding second content area in response to the selected first content item including the resizable content item property; and
  the assigning comprises assigning the resized selected first content item to the corresponding second content area.

16. The computer program product of claim 10 wherein: the automatically identifying content rules comprises:
  identifying a value for a second content area image property for any of the second content areas;
  identifying a value for a first content area image property for any of the first content areas; and
  determining whether the value of the first content area image property corresponds to the value of the second content area image property, and
  assigning the selected first content item to the corresponding second content area is also in response to the value of the first content area image property corresponding to the value of the second content area image property.

17. The computer program product of claim 10 wherein: the automatically identifying content rules comprises:
  identifying a value for a second content area text property for any of the second content areas;
  identifying a value for a first content area text property for any of the first content areas; and
  determining whether the value for the second content area text property corresponds to the value for the first content area text property, and
  assigning the selected first content item to the corresponding second content area is also in response to the value for the second content area text property corresponding to the value for the first content area text property.

18. A system for automatically assigning items to printable media, comprising:
  a computer device,
  a computer readable medium in communication with the computing device, the computer readable medium comprising one or more programming instructions for:
    electronically obtaining a first template comprising a plurality of first content items, wherein each of the first content item comprises a first content area,
    for each of the first content items, identifying one or more first content area properties and one or more first content item properties,
    electronically obtaining a second template comprising a plurality of second content areas,
    for each of the second content areas, identifying one or more second content area properties and one or more second content item properties,
    automatically identifying one or more content rules based on the second content area properties, the second content item properties, the first content area properties and the first content item properties,
    selecting any of the first content items,
    determining whether the selected first content item corresponds to any of the second content area based on the corresponding content rules, and
    automatically assigning the selected first content item to a corresponding one of the second content area in response to determining that the selected first content item correspond to the corresponding second content area, and
    printing a representation of the selected first content item in the corresponding second content area based on the second template;
  wherein:
    the automatically identifying one or more content rules comprises:
      identifying a value for a first content item importance property for the selected first content item,
      identifying a value for a second content item importance property for an additional one of the first content items, and
      determining that the value for the second content item importance property is less than the value for the first content item importance property; and
    assigning the selected first content item, rather than the additional first content items, to the corresponding one of the second content areas is also in response to the value for the second content item importance property being less than the value for the first content item importance property.

19. A computer program product, comprising a non-transitory computer readable medium having a computer readable program code embodied therein, said computer readable program code adapted to be executed to implement a method for automatically assigning items to a piece of media, the method comprising:
  electronically obtaining a first template comprising a plurality of first content items, wherein each of the first content item comprises a first content area,
  for each of the first content items, identifying one or more first content area properties and one or more first content item properties,
  electronically obtaining a second template comprising a plurality of second content areas,
  for each of the second content areas, identifying one or more second content area properties and one or more second content item properties,
  automatically identifying one or more content rules based on the second content area properties, the second content item properties, the first content area properties and the first content item properties, selecting any of the first content items:

determining whether the selected first content item corresponds to any of the second content area based on the corresponding content rules, and automatically assigning the selected first content item to a corresponding second content area in response to determining that the selected first content item corresponds to the corresponding second content area, and printing a representation of the selected first content item in the corresponding second content area based on the second template;

wherein:

the automatically identifying one or more content rules comprises:

identifying a value for a first content item importance property for the selected first content item, identifying a value for a second content item importance property for an additional one of the first content items, and determining that the value for the second content item importance property is less than the value for the first content item importance property; and assigning the selected first content item, rather than the additional first content item, to the corresponding one of the second content area is also in response to the value for the second content item importance property being less than the value for the first content item importance property.

* * * * *